United States Patent [19]

Tanabe et al.

[11] Patent Number: 5,490,145
[45] Date of Patent: Feb. 6, 1996

[54] COMMUNICATION SYSTEM FOR A RING-TYPE NETWORK

[75] Inventors: Takumi Tanabe, Osaka; Hiroaki Asano, Katano; Shinako Nishioka, Kyoto; Osamu Tanaka, Neyagawa; Shiro Iwasaki, Iizuka, all of Japan

[73] Assignee: Matsushita Electric Industrial Company, Ltd., Osaka, Japan

[21] Appl. No.: 248,862

[22] Filed: May 24, 1994

[30] Foreign Application Priority Data

May 25, 1993 [JP] Japan ..................... 5-122909

[51] Int. Cl.$^6$ .................................. H04J 3/16
[52] U.S. Cl. ............ 370/85.4; 370/85.12; 370/85.15
[58] Field of Search ................... 370/85.1, 85.2, 370/85.3, 85.4, 85.5, 85.15; 340/825.05

[56] References Cited

U.S. PATENT DOCUMENTS

| | | | |
|---|---|---|---|
| 4,567,590 | 1/1986 | Bederman | 370/85.15 |
| 4,932,023 | 6/1990 | Geyer et al. | 370/85.4 |
| 5,155,725 | 10/1992 | Khalil | 370/85.4 |
| 5,274,637 | 12/1993 | Sakamura et al. | 370/85.4 |

FOREIGN PATENT DOCUMENTS

| | | |
|---|---|---|
| 63-240148 | 10/1988 | Japan. |
| 3-205936 | 9/1991 | Japan. |

*Primary Examiner*—Douglas W. Olms
*Assistant Examiner*—Ricky Q. Ngo
*Attorney, Agent, or Firm*—Ratner & Prestia

[57] ABSTRACT

The invention provides a communication network system which permits parallel access of a plurality of nodes to a transmission line and which has a high throughput and low delay, with fairness among the nodes maintained. In the communication network system, a plurality of tokens correspondingly associated with the nodes, respectively, are allowed to circulate on the transmission line. Each node is allowed to transmit data only when the frame insertion buffer is empty. The node, when having data to be transmitted, awaits the arrival of a token. If a token that has arrived corresponds to the self node, or if a node corresponding to the arrived token is downstream of the destination node as viewed from the own self node, the node forms a packet from its holding data and transmits it onto the transmission line.

18 Claims, 10 Drawing Sheets

Fig. 4a

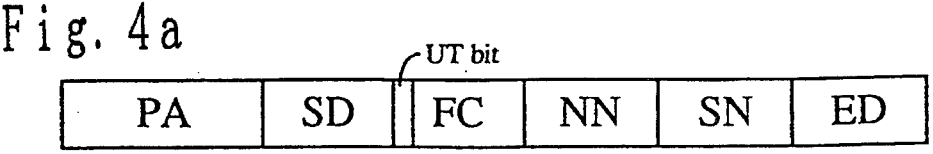

PA: Preamble
SD: Start Delimiter
UT: Used Token
FC: Frame Contol
NN: Node Number
SN: Sequence Number
ED: End Delimiter

Fig. 4b

DA: Destination Address
SA: Source Address
LEN: Length
CRC: Cyclic Redundancy Check
ED: End Delimter

Fig. 8a

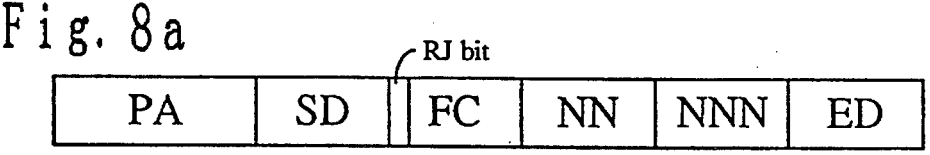

PA: Preamble
SD: Start Delimiter
RJ: Rejected
FC: Frame Contol
NN: Node Number
NNN: Neighbor Node Number
ED: End Delimiter

Fig. 8b

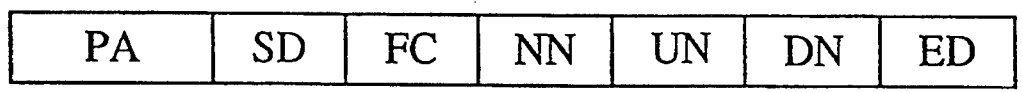

PA: Preamble
SD: Start Delimiter
FC: Frame Contol
NN: Node Number
UN: Upperstream Neighbor Node Number
DN: Downstream Neighbor Node Number
ED: End Delimiter PA: Preamble           NN: Node number
SD: Start Delimiter    ED: End Delimiter
FC: Frame Control

COMMUNICATION SYSTEM FOR A RING-TYPE NETWORK

BACKGROUND OF THE INVENTION

1. Field of the Invention

The present invention relates to a communication network system for executing data exchange among a plurality of nodes connected onto a transmission line.

2. Description of the Prior Art

In trials for higher-speed local area networks (hereinafter, referred to as LAN) that have been put into practical use so far, parallel access of a LAN with two or more nodes, i.e. spacial reuse of the transmission line is not permitted from the viewpoint of architectural simplification, as is typified by FDDI(fiber distributed data interface). However, adopting such a method would involve the following problems. Firstly, only a single node is allowed to access the network at all times. As a result, the throughput of the system is smaller than that for the bandwidth of the transmission line. Secondly, wider bandwidths lead to lower efficiency. Thirdly, greater size of LANs would take a longer time to acquire a right of access to the transmission line, which would result in increased delay of data transmission. To solve these problems, various types of communication network systems have been proposed in recent years.

Japanese Patent Laid-Open Publication SHO 63-240148 has proposed a communication network in which a plurality of nodes are connected to one another by a transmission line in the form of ring, where transmission frames divided into a plurality of transmission areas are circulated on the transmission line. Tokens are assigned to the transmission areas, respectively. For data transmission, each node acquires any one of the tokens and outputs data to its corresponding transmission area. Thus, spacial reuse of the transmission line is implemented.

In this patent, however, the length of data transmitted at a time is limited by the length of the transmission area. Also, when only a small number of nodes less than the number of tokens are transmitting data, some transmission areas are out of use, inefficiently. In particular, when the number of nodes on the transmission line is less than the number of tokens, part of the transmission line is at all times out of use. Reducing the number of tokens to avoid this would result in a lower throughput. Besides, this patent could not ensure the fairness for the nodes to access the transmission line.

Japanese Patent Laid-Open Publication HEI 3-205936 (U.S. Pat. No. 4,926,418) has proposed a system in which a dual ring is assumed as a transmission line, where the nodes utilize a buffer insertion access control mechanism. Each node on the transmission line has a frame insertion buffer and is able to transmit a packet onto the transmission line as far as the frame insertion buffer is empty. Any packet that has been transmitted from an upperstream node during data transmission and destined to any other than the node is temporarily stored in the frame insertion buffer, and relayed onto the transmission line at the time point when my-node packet transmission has been completed. Further, the quantity of packets that can be transmitted by each node at a time is limited by using a control message circulating in a direction opposite to the direction of packet transmission so that the fairness over the whole network can be maintained. The maximum number of frames (hereinafter represented by k) that can be transmitted by the time when one node observes two successive control messages as well as the number of frames (hereinafter represented by 1) that can at least be transmitted between two successive control messages are determined.

This patent, however, takes the dual ring as a presumption, so that it cannot be utilized with a single ring. Moreover, when a control message is lost, more than k number of packets cannot be transmitted by a time-out. Further, once a control message is lost, a large number of nodes generate control messages, with the result that a plurality of control messages flow on the transmission line. When a node holding a control message receives another control message, the newly coming control message is discarded so that the control messages are settled finally into one. However, since the node reacts with control messages that come up one after another before the settlement, the packet transmission is blocked to one in number. Furthermore, this system uses a method different from the conventional access control method using tokens, thus having difficulty in succeeding the existing techniques.

SUMMARY OF THE INVENTION

Accordingly, an object of the present invention is to provide a communication network system which allows two or more nodes to simultaneously access the transmission line and which has fairness, with the existing token control techniques effectively utilized.

Another object of the present invention is to provide a communication network system which, even if one of control messages for the control of access to the transmission line is lost, can perform data transmission by using another control message.

Yet another object of the present invention is to provide a communication network system which permits variable length packets and yet which will not cause any increase in transmission delay.

Still another object of the present invention is to provide a communication network system which can flexibly cope with changes in the number of nodes on the transmission line.

To achieve the above objects, the present invention provides a communication network system in which a plurality of nodes are connected to one another on a transmission line, where data transmitted on the transmission line is eliminated by a destination node of the data. The nodes are each equipped with a frame insertion buffer. Further, a plurality of tokens corresponding to the nodes, respectively, circulate on the transmission line. Any one of the nodes on the transmission line, when having data to be transmitted, acquires a token corresponding to the node and transmits the data onto the transmission line when the frame insertion buffer is empty. Data and tokens that the node have received during data transmission are stored in the frame insertion buffer.

The above-described arrangement allows two or more nodes to simultaneously access the transmission line. Also, each node is given a right to access the transmission line by a token corresponding to the node, and therefore is enabled to fairly utilize the transmission line. Further, the above arrangement has no restriction, in its essential sense, in the length of packets flowing on the transmission line, thus permitting variable length packets.

Preferably, when a first node having data destined to a second node on the transmission line has detected a token, a comparison is made between a third node to which the token corresponds, and the second node to which the data is destined. When the third node is downstream of the second node (i.e. the third node is located between the second node and the first node as the direction of circulation of tokens is referenced), the first node acquires the token and transmits the data.

With the above arrangement, even if one of the tokens for control of access to the transmission line is lost, the node can acquire a token which is corresponded to a node located downstream of the destination of data to be transmitted and transmit the data. Furthermore, with the above arrangement, a node in some cases can acquire a right to access the transmission line even when it has detected a token other than corresponding to the self node. Thus, the transmission line can be utilized more effectively and transmission delay can be suppressed.

More preferably, when a node is newly connected to the transmission line, tokens flowing along the transmission line are observed. As a result of the observation, a token unique to the new node and different from the tokens flowing on the transmission line is generated and transmitted to the transmission line. Also, a node which is to leave the transmission line eliminates the token corresponding to the node before leaving it.

The above-described arrangement enables the communication network system to flexibly cope with changes in the number of nodes on the transmission line.

BRIEF DESCRIPTION OF THE DRAWINGS

FIG. 4a is a format diagram for explaining an example of the configuration of the token;

FIG. 4b is a format diagram for explaining an example of the configuration of the packet;

FIG. 8a is a format diagram showing an example of the configuration of a start control message used in connecting a new node to the communication ring;

FIG. 8b is a format diagram showing an example of the configuration of a configuration change control message used in changing the configuration of the communication ring;

DETAILED DESCRIPTION OF THE PREFERRED EMBODIMENTS

Figure 2:
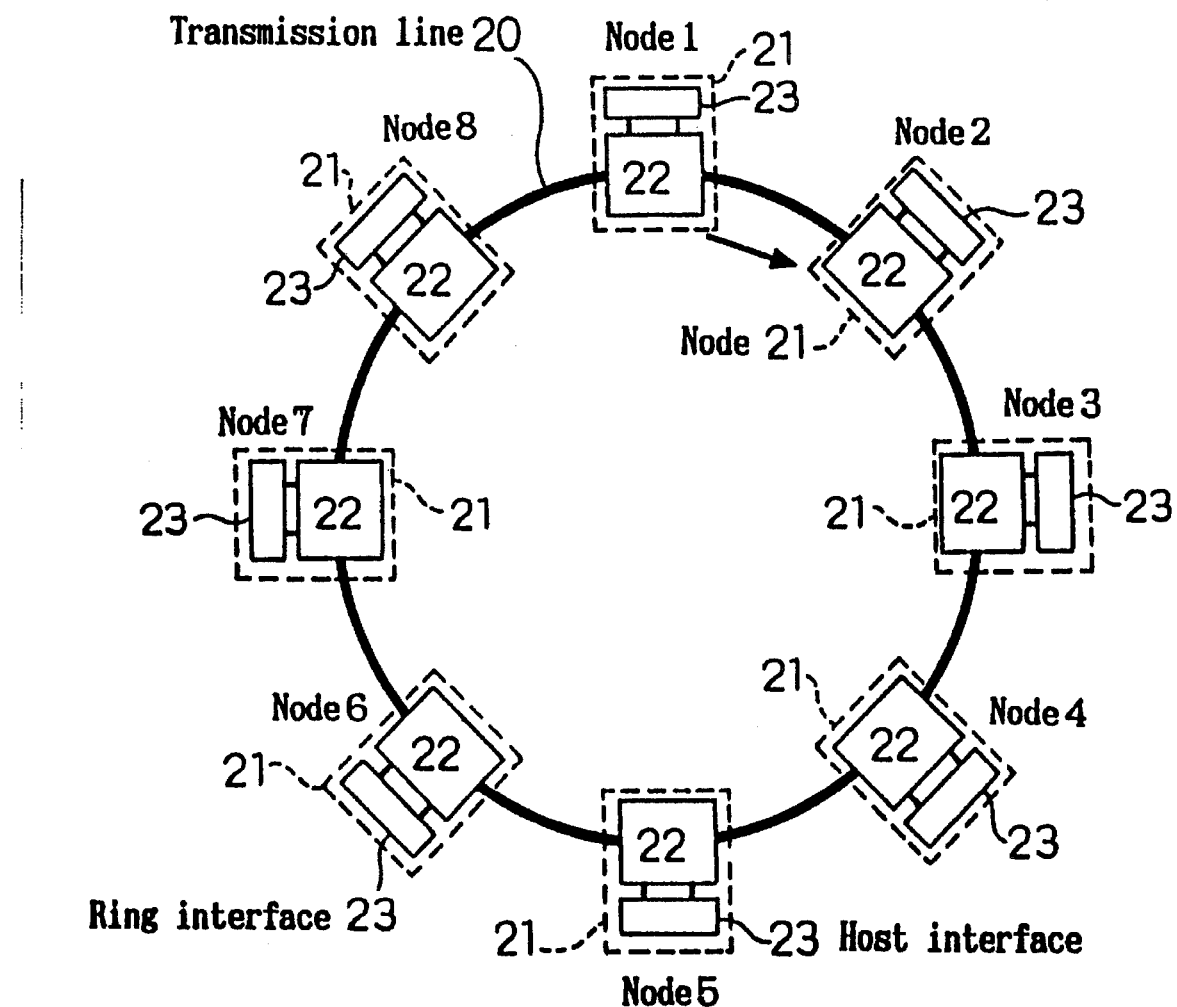
FIG. 2 is a schematic view of the communication ring used in the communication network system of the present invention.

As shown in FIG. 2, the topology of a communication ring which is described in the present embodiment is a ring topology comprising one single ring. In FIG. 2, eight nodes 21 of node 1 through node 8 are connected to a transmission line 20. The nodes are assigned their own node numbers (1 through 8 in this embodiment). A node number for broadcasting use (0 in this embodiment) is additionally retained. In each node, numeral 22 denotes a ring interface, and 23 denotes a host interface. The host interface 23 is connected to a CPU and a memory of the host via buses. The ring interface 22 is connected to the transmission line 20. The packet is eliminated from the ring with a destination node.

Figure 3:
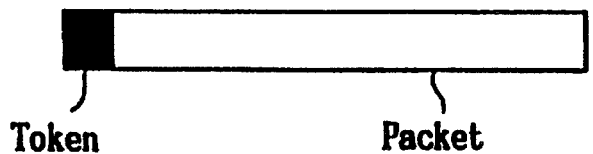
FIG. 3 is a relational diagram of a token and a packet.

In the present embodiment, a node that has acquired an available token transmits the token by adding it at the head of the packet, as shown in FIG. 3. Hereinafter, the unit having a token added at the head of a packet is referred to as a frame.

Figure 1:
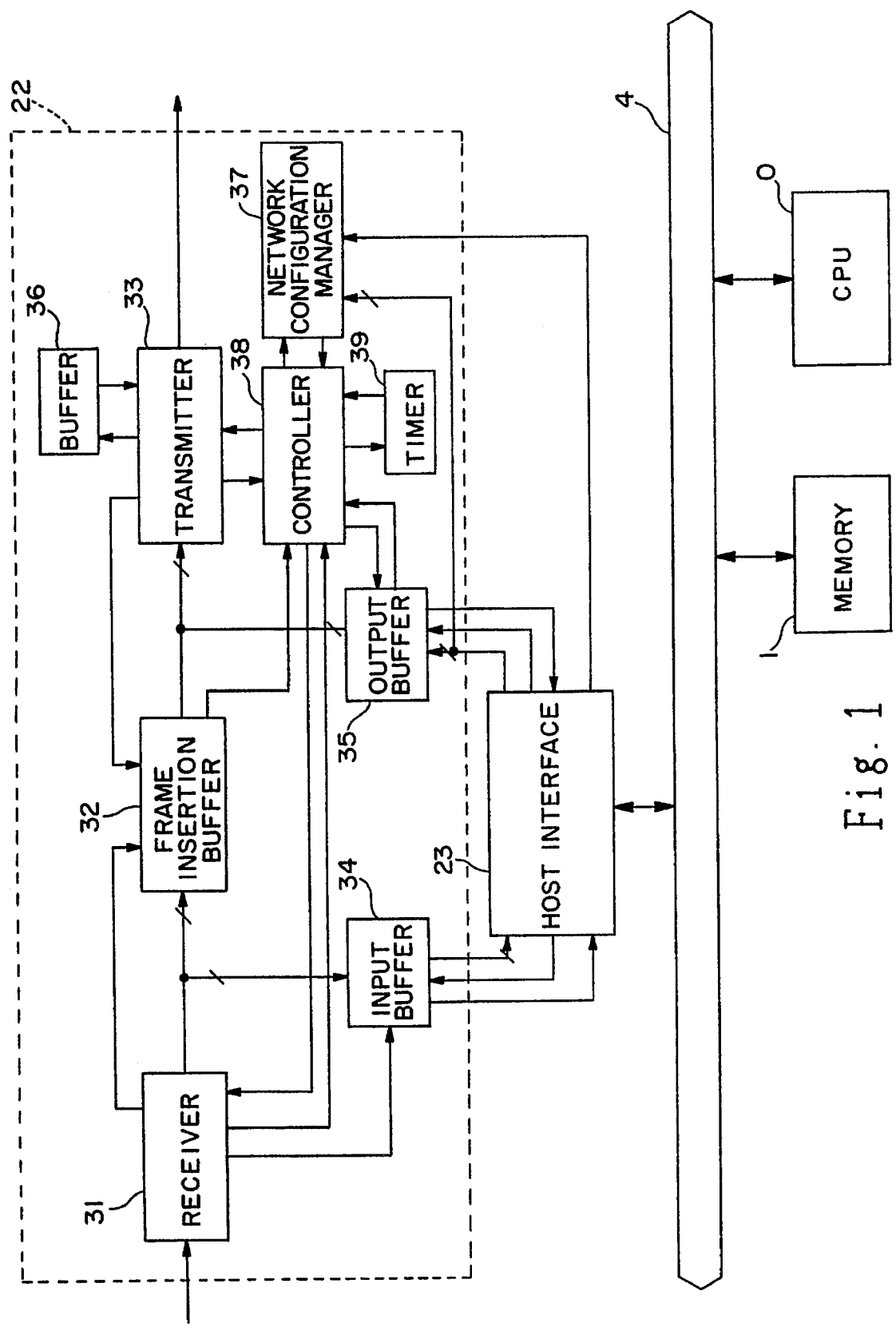
FIG. 1 is a configuration diagram of the inside of nodes constituting the communication network system of the present invention.

As shown in FIG. 1, the ring interface 22 includes a frame insertion buffer 32 having a size equivalent to one maximum-size frame. The host interface 23 is connected to a bus 4. A CPU 0 exchanges data with a memory 1 and the host interface 23 via the bus 4. The host interface 23 uses an input buffer 34 and an output buffer 35, respectively, to read from and write into the memory 1 packets derived from the self node and destined to the self node.

Numeral 31 denotes a receiver, which serves for receiving serial data from the transmission line 20, decoding received data, detecting a start delimiter derived from an arrival bit train, discriminating whether the arrival bit train is a packet, a token, or a message recognizing an arrival packet and performing CRC check, and discriminating whether or not an arrival packet is destined to the local node.

Numeral 33 denotes a transmitter, which serves for adding a start delimiter, CRC, and a token to a packet, encoding transmission data, and transmitting serial data.

During the transmission of a packet by a node, if another frame that is not destined to the own self node, tokens or a message has arrived at the receiver 31 from the transmission line 20, the frame, tokens or messages is stored in the frame insertion buffer 32 until the packet transmission is completed.

Numeral 36 denotes a buffer, which holds templates of a token corresponding to the own self node, that is, a token assigned to the own self node (hereinafter, referred to as my token) and of various messages.

Numeral 37 denotes a network configuration manager, which has stored locations and node numbers of all the nodes that are connected to the transmission line 20. Numeral 38 denotes a controller, which performs transmission and reception management and timer management. Numeral 39 denotes a timer for monitoring the arrival intervals of my tokens.

FIG. 4a shows a token used in the present embodiment. A PA (preamble) field is added at the head of every transfer unit for discriminating a token from frames and the other tokens or messages. An SD (Start Delimiter) field serves as a boundary showing that significant information follows. An FC (Frame Control) field describes that the present transfer unit is a token, and further includes a UT (Used Token) bit.

The UT bit is an identifier for identifying whether or not the token is in use. An NN (Node Number) field contains a node number of a node to which the token is corresponded. An SN (Sequence Number) field contains a sequence number of a token which is used when the token is lost. An ED (Ending Delimiter) field serves as a boundary showing that the significant information has ended. When a token is added to the packet and circulates on the transmission line as part of the frame, the ED field is added at the end of the frame, i.e. at the end of the packet.

FIG. 4b shows a packet used in the present embodiment. A DA (Destination Address) field contains a node number of the destination of the packet. An SA (Source Address) field contains a node number of the transmission source of the packet. An LEN (length) field contains a length from the DA field to the end of the data portion. The data portion, which is variable in length, contains transmission data. CRC is the check sum from the DA field to the end of the data portion. An ED is added to the end of the packet as an end of the frame.

Next the outline of the operation of the embodiment is described.

When a received packet is a packet destined to the self node or a packet that has been broadcast, the receiver 31 transfers the packet to the input buffer 34, and then the packet is transferred to the memory 1 via the host interface 23. In this process, the token that has been transmitted as arranged at the head of the packet is separated from the packet, and returned onto the transmission line 20 via the transmitter 33. If there is any packet to be transferred in the memory 1, the CPU 0 transmits this packet to the host interface 23 via the bus 4, and the host interface 23 further transfers the packet to the output buffer 35. The detail description of the operation is mentioned below.

Firstly the data receiving method is described in detail.

When the receiver 31 receives the serial data from the transmission line 20, the receiver 31 decodes the serial data. Further the receiver 31 searches the bit pattern of the start delimiter from the decoded bit stream.

When the receiver 31 finds out the start delimiter, it considers the bit stream after the start delimiter meaningful. The receiver 31 examines the FC field of the received bit stream and the UT bit in the FC field, and determines whether the bit stream is such frame including in-use token or not. When the bit stream is the frame including in-use token, the receiver 31 examines the DA field of the frame, and when the number of the DA field is the node number of my token (that is it is for self node), or the node number for the broadcasting, the receiver 31 transmits the packet of the frame to the input buffer 34. The packet transmitted to the input buffer 34 is transferred to memory 1 via the host interface 23. The receiver 31 separates the received token which is at a head position of the frame from the frame, and transmits the token to the frame insertion buffer 32. At the time the receiver 31 changes the UT bit of the token to a value which means un-use condition. Further at the time the receiver 31 separates PA field of the token. The SD field is sent to the frame insertion buffer 32 with attached to the token. Hereinafter when the token, frame, or messages are transferred to the frame insertion buffer 32, the PA field is separated and the SD field is attached.

When the frame insertion buffer 32 is empty and the transmitter 33 is not transmitting data from self node, the token separated from the received frame is sent to the transmitter 33 with passing through the frame insertion buffer 32.

The transmitter 33 adds the PA, ED fields to the token and encodes and transmits the token on the transmission line 20. When the frame insertion buffer 32 is not empty or the transmitter 33 is transmitting data from self node, the token is stored at the end position of the bit stream stored in the frame insertion buffer 32 (if the frame buffer 32 is empty, the token is stored at the top position of the frame buffer 32.).

When the receiver 31 examines the DA field of the frame including in-use token and finds that the frame is not for the self node and neither for the broadcasting, the receiver 31 transfers the received frame to the frame insertion buffer 32. The operation of the node after the frame transferring, is same to that of the method of the token transmission described above.

When the receiver 31 finds that the received and decoded serial data is such bit stream which is other than the frame including the in-use token, the receiver 31 transfers the bit stream to the frame insertion buffer 32. The operation of the node after the bit stream transferring, is same to that of the method of the token transmission described above. But when there is data to be transmitted in the output buffer 35, the operation is same to that of a method of data transmission described follows.

Next the method of data transmission is described in detail with reference to FIG. 5.

Figure 5:
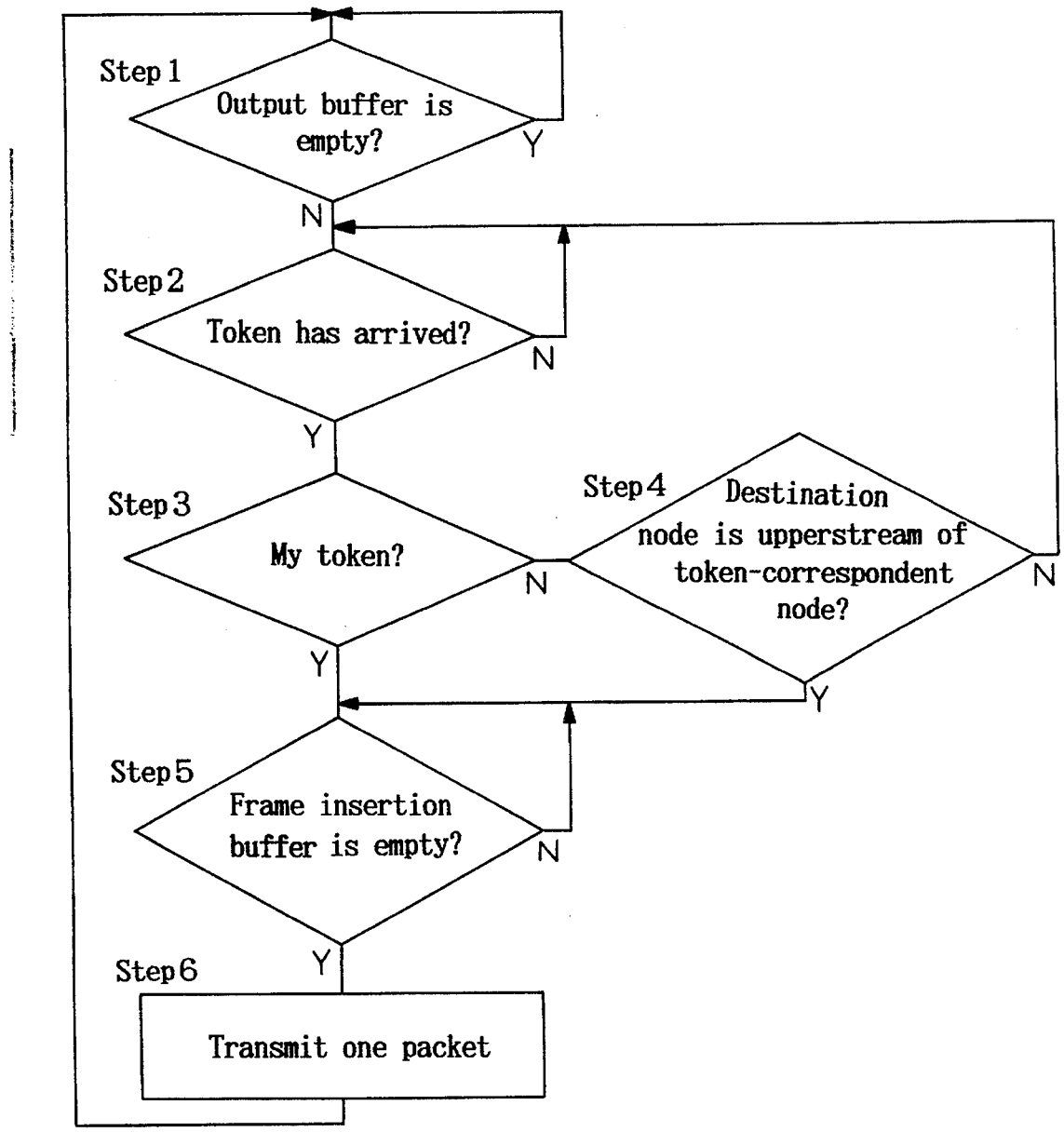
FIG. 5 is a flow chart showing the method of data transmission.

In FIG. 5, when data to be transmitted to transmission line 20 is sent from the host interface 23 to the output buffer 35 and the data is stored in the output buffer 35 (step 1), the controller 38 is informed of a destination node number of the data. The controller 38 informs the network configuration manager 37 of the destination node number. The network configuration manager 37 searches and holds all the node numbers of the nodes that are present downstream of the destination node (i.e. nodes located between the self node and the destination node as the direction of circulation of tokens is referenced, other than the destination node itself).

And when the receiver 31 receives serial data from the transmission line 20, it decodes and searches the bit pattern of the start delimiter. When the receiver 31 finds the start delimiter and meaningful bit stream, it examines FC field of the bit stream and UT bit in the FC field. Thus the receiver 31 determines whether the received bit stream is un-use token or not(step 2). When it is unused, the receiver 31 informs the controller 38 of its NN field and SN field. And the received token is transferred to the frame insertion buffer 32. When the frame insertion buffer 32 is empty, the token is sent to the transmitter 33 with passing through the frame insertion buffer 32. When the frame insertion buffer 32 is not empty, it is stored at the end position.

If the value of the NN field of which the controller 38 has been informed coincides with the node number of the self node (i.e. my token) (step 3), the controller 38 checks whether or not the frame insertion buffer 32 is empty (step 5). The controller 38 has been informed of whether or not the frame insertion buffer 32 is empty, each time an input or output of data to this buffer has occurred.

If the frame insertion buffer 32 is empty, the controller 38 instructs the output buffer 35 to transfer the packet from the output buffer 35 to the transmitter 33. At the same time, the controller 38 gives an instruction to the frame insertion buffer 32 so that the frame insertion buffer 32 temporarily stores frames or tokens that arrive thereat from this time point on.

The transmitter 33 adds the token transmitted from the receiver 31 to the head of the packet derived from the output buffer 35 to form a frame, and rewrites the UT bit of the token during its use. The transmitter 33 generates PA and ED fields of the frame, counts the CRC, adds these results to the frame to complete the frame, and transmits it onto the transmission line 20 (step 6). After the transmission of the frame, the transmitter 33 informs the controller 38 of the end of transmission. Then the controller 38 gives an instruction to the frame insertion buffer 32 so that the frame insertion buffer 32 stops frames and tokens, and transmits the stored frames or tokens to the transmitter 33.

In the step 2 when the bit stream received by the receiver 31 is not un-use token, the receiver 31 sends the bit stream to the frame insertion buffer 32. But the bit stream is such frame for the self node, as described in the data receiving method, the packet part is transferred to the input buffer 34 and the token part is only transferred to the frame insertion buffer 32.

Further if the token that has arrived at step 3 is not my token, the controller 38 informs the network configuration manager 37 of the node number of the NN field. The network configuration manager 37 determines whether or not this number is included in the numbers of the nodes that are present downstream of the destination node searched and held before (step 4). If included, the operation of steps 5 and the following is executed. For example, when the packet is transmitted from node 1 to node 5 in FIG. 2, node 1 is allowed to use the tokens including node numbers 1 through 4 in the NN field.

Next described are the operation of recovering a token involved when a token is lost, the operation of detecting whether or not two or more my tokens are flowing on the transmission line, and the operation of eliminating a token in such a case, in the present embodiment.

When a token has arrived at the receiver 31, the controller 38 is informed of values of the NN and SN fields. The controller 38 compares the value of the NN field of which it has been informed, to the node number of the self node. If the two coincide with each other (i.e. if my token has arrived), the timer 39 is activated to count the time elapsing until my token arrives as a token wait time. Thereafter, each time my token has arrived, the timer 39 is reactivated. When the token wait time counted by the timer 39 exceeds a maximum value of circulation time of an expected token (maximum token wait time), a time-out takes place, and the timer 39 informs the controller 38 of it. The controller 38 also holds a sequence number contained in the SN field of my token that has been finally generated and transmitted, as a current sequence number. Based on these assumptions, the operations of recovering a token, and detecting and eliminating an overlapping token are now described with reference to FIG. 6.

Figure 6:
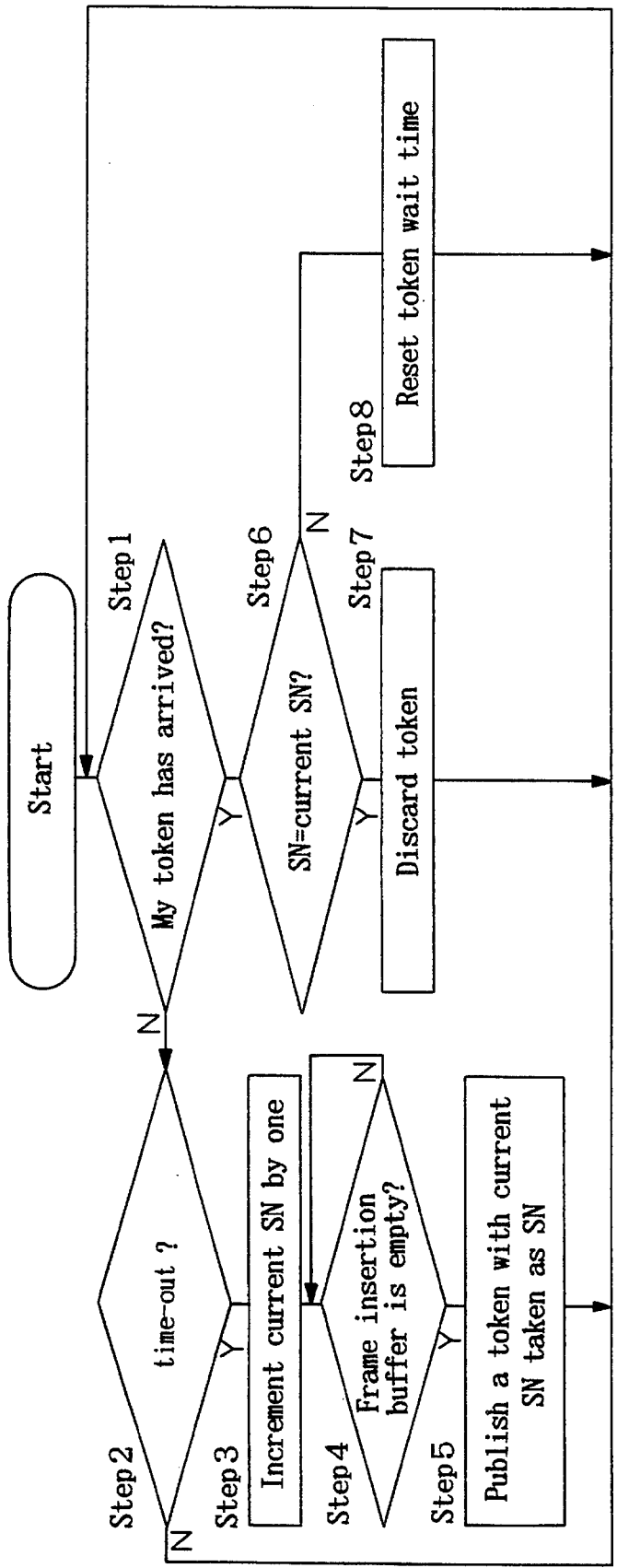
FIG. 6 is a flow chart showing the method of recovering a token, detecting and eliminating an overlapping token.

Referring to FIG. 6, the controller 38 monitors the arrival of my token (step 1). When informed of a time-out from the timer 39 (step 2) before the arrival of my token, the controller 38 increments its holding current sequence number by one (step 3). Then, the controller 38 determines whether or not the frame insertion buffer 32 is empty (step 4). If the frame insertion buffer 32 is empty, the controller 38 informs the transmitter 33 of the incremented current sequence number. The transmitter 33 releases onto the transmission line 20 my token stored in the buffer 36, in which the current sequence number derived from the controller 38 is written in its SN field (step 5).

The increment of the current sequence number at step 3 is calculated by the modulo of the maximum value of the sequence number derived from the length of the SN field. If the frame insertion buffer 32 is not empty at step 4, it is awaited that the frame insertion buffer 32 will become empty.

When the controller 38 has detected the arrival of my token (step 1), the controller 38 determines whether or not the sequence number contained in the SN field of the arrival my token coincides with the held current sequence number (step 6). If they do not coincide with each other, the controller 38 informs the transmitter 33 of the fact that a plurality of my tokens are circulating on the transmission line 20. In this case the transmitter 33 inhibits the token transferred from the receiver 31 from being released onto the transmission line 20, thereby discarding this token (step 7). On the other hand if they coincide with each other, the controller 38 informs the timer 39 of it, so that the counting of the token wait time is reset to zero (step 8). The transmitter 33 transmits the transferred token onto the transmission line 20 as it is.

As described above, according to the present invention, it is possible for a plurality of nodes to simultaneously access the transmission line with the existing token processing technique succeeded. Also, at least one of the tokens that are flowing in a number equivalent to the number of nodes is my token and usable whenever it has arrived. In other words, if the number of nodes is N, any node can acquire my token and transmit a packet at least one time out of N times of token arrivals. Thus, fairness can be maintained. Furthermore, according to the present invention, even if my token has been lost for some reason, it is possible to recover the lost token by a mechanism substantially similar to the existing token processing technique. Even while my token is lost under the process of recovery, it is also possible to execute packet transmission by using another token. Moreover, the present invention has no particular restrictions on the packet length.

Meanwhile in the above description the receiver 31 does not send any information to the controller 38 when it receives the frame for the self node. But the receiver 31 can send the value of the NN field contained in the token to the controller 38 when it receives the frame for the self node. Under this method, when there is data to be transmitted in the output buffer 35, it is possible to use the token which is included in the frame for the self node, for the transmitting of the data. That is when the value of the NN field is such node number which is assigned to such node that is at the down stream against the destination node of the data in the output buffer 35, the token which is separated from the frame for the self node can be utilized for the transmitting of the data stored in the output buffer 35.

Further the receiver 31 can send the values of the NN field and the SN field to the controller 38 when it receives the frame for the self node. By such method the number of token which can be used at the data transmitting can be increased by 1. That is the token corresponding to the data destination can be used for data transmission. When the token corresponding to the data destination is used for data transmission, such case can be occurred that the my token is included in the frame for the self node. The receiver 31 which received the frame for the self node informs the value of the NN field of the received frame to the controller 38. Thus even if the frame received by the receiver 31 includes my token, the controller 38 can recognizes the arriving of the my token, and therefore it can transmit self data by using the token. And because such case can be occurred that the my token is included in the frame for the self node, the receiver 31 of the node receiving the frame for the self node, must also inform the the value of SN field to the controller 38 operation steps 6 and the following in FIG. 6.

Next described is the operation of connecting a new node to the transmission line 20 in the present invention.

Figure 7:
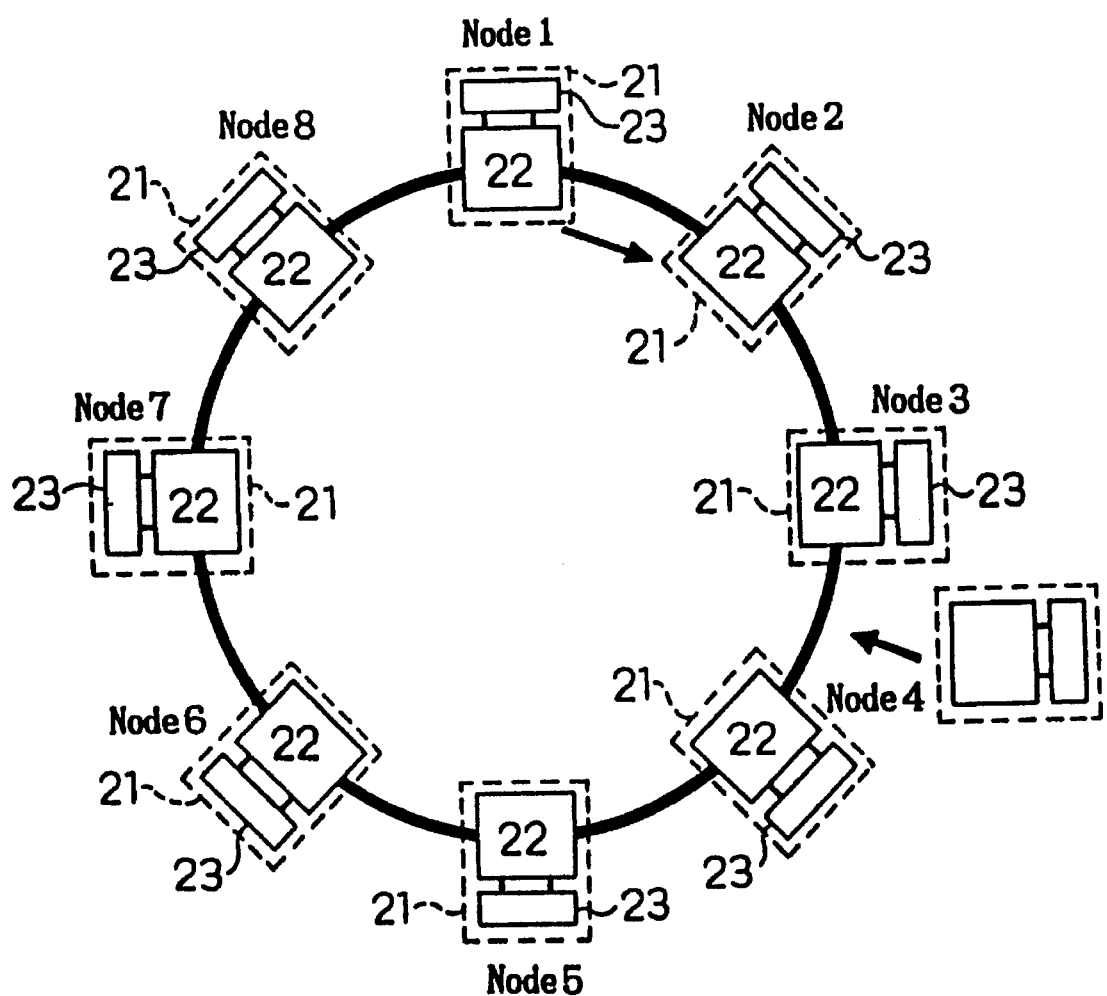
FIG. 7 is an explanatory view for explaining the operation in connecting a new node to the communication ring of FIG. 2.

As shown in FIG. 7, here is described a case where a new node is connected between node 3 and node 4 in the communication ring as described with reference to FIG. 2. The configuration of the nodes 21 is the same as described with reference to FIG. 1.

In such a case, a token corresponding to the newly connected node must be circulated on the transmission line 20. For this purpose, the newly connected node must be assigned a unique node number different from that of any other node connected to the transmission line 20. Also, all the nodes on the transmission line 20 including the new node must know the new network configuration.

The start control message and the configuration change control message as shown in FIGS. 8a and 8b are used for these purposes. The PA field, SD field, and ED field in both figures are similar to those described in FIG. 4a.

In the FC field in FIG. 8a, a description is made of being a start control message. Also, the FC field contains an RJ (Reject Identifier) bit, which is used to make it known that the node number of the new node overlaps any other, when applicable. The value of the RJ bit is 1 when the node number of the start control message containing the RJ bit overlaps any other, and 0 when it does not overlap. The NN field contains therein the node number assigned to the new node. The method of assigning a node number to a new node will be described later. An NNN (Neighbor Node Number) field finally contains therein a node number of a neighbor node located immediately downstream of the new node. The NNN field has a node number 0 for broadcasting use written as an initial value. The method of knowing the neighbor node will be described later.

In the FC field in FIG. 8b, a description is made of being a configuration change control message. The NN field contains therein a node number assigned to a new node. The UN (Upperstream Neighbor node number) field contains therein a node number of an immediately upperstream neighbor node, while the DN (Downstream Neighbor node number) field contains therein a node number of an immediately downstream neighbor node. The method of knowing the neighbor node will be described later.

As to the start control message and the configuration change control message, their templates are previously retained in the buffer 36. The NNN field and the RJ bit of a start control message each have a 0 written therein.

By using the flow charts of FIG. 9a and FIG. 9b, the operation of newly connecting a node to the transmission line 20 is described below.

Figure 9A:
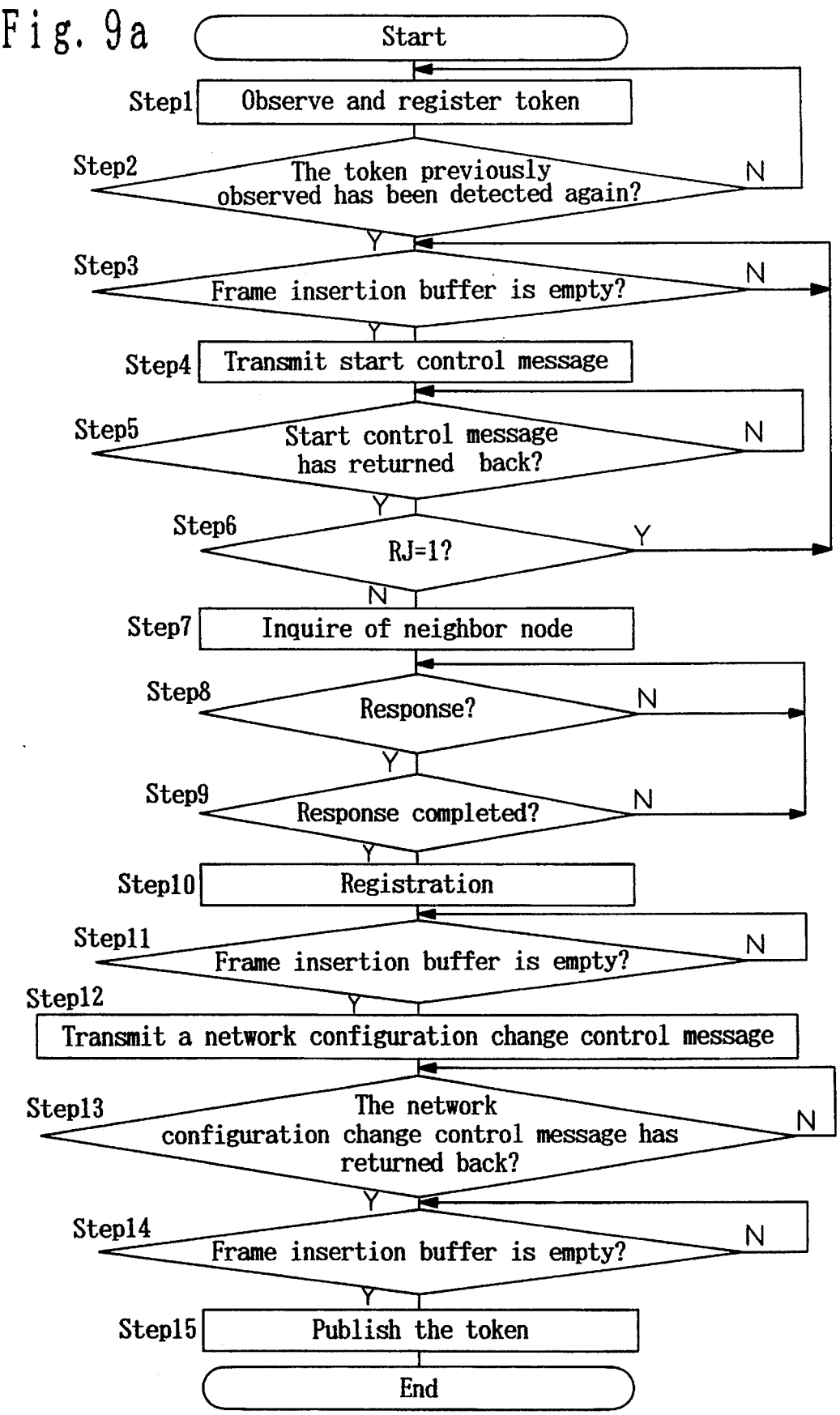
FIG. 9a is a flow chart showing the operation of a node that is to be newly connected to the communication ring.

First described with reference to FIG. 9a is the operation of the node that is to be newly connected.

In FIG. 9a, the node to be newly connected is first connected physically to the transmission line 20. Then, the receiver 31, each time it receives a token on the transmission line 20, informs the controller 38 of the value of the NN field of the token. The controller 38 informs the network configuration manager 37 of the value of the NN field of which the controller 38 has been informed, i.e. the node number of another node on the transmission line, and the network configuration manager 37 holds this value (step 1). During this process, the receiver 31 lets the received token pass through the frame insertion buffer 32, transferring it to the transmitter 33. The transmitter 33 transmits the transferred token onto the transmission line 20 as it is.

The network configuration manager 37, when informed by the controller 38 of a node number that it has already held, assumes that it has acquired the node numbers of all the nodes on the transmission line 20 (step 2), informing the controller 38 of node numbers other than already registered.

The controller 38 determines whether or not the frame insertion buffer 32 is empty (step 3). If it is empty, the controller 38 instructs the transmitter 33 to transmit a start control message. The controller 38 further informs it of the node numbers of which the controller 38 has been informed. The transmitter 33 takes out the template of the start control message held in the buffer 36, makes the informed node number contained in the NN field of this start control message, and transmits it onto the transmission line 20 (step 4). In this case, it is assumed that 9 has been selected as the node number and a start control message containing 9 in the NN field has been transmitted.

When the receiver 31 receives the start control message that has returned back around the transmission line (step 5), the transmitter 33 informs the controller 38 of it, and further the receiver 31 informs the controller 38 of the values of the NNN field and the RJ bit.

The controller 38 checks the value of the RJ bit of which it has been informed. If the RJ bit shows that the value is 0, i.e. the node number in the NN field has been accepted by all the nodes connected to the transmission line 20 (step 6), then the controller 38 informs the network configuration manager 37 of the node number of a neighbor node contained in the NNN field (4 in this embodiment). The method of making the node number of a neighbor node contained in the NNN field will be described later with reference to FIG. 9b.

The network configuration manager 37 informs the host interface 23 of the node number 4 of the neighbor node. The host interface 23 informs the CPU 0 of the node number 4 via the bus 4. The CPU 0 generates on the memory 1 a packet which contains in the data section the fact that it makes an inquiry on the network configuration, and which is destined to node 4. This packet is transferred to the host interface 23 via the bus 4, and further transferred to the output buffer 35.

Thereafter, according to the method of data transmission as described with reference to FIG. 5, the frame to which a token has been added at the head of the packet within the output buffer 35 is transmitted onto the transmission line 20 (step 7). The token used in this case is a token corresponding to node 4.

The node 4 transmits in return the frame containing configuration information. When the frame containing configuration information has returned back from node 4 (step 8), the receiver 31 eliminates the token from the frame, returning it back to the transmission line 20, and further transfers the remaining packet portion to the input buffer 34. This packet is transferred from the host interface 23 onto the memory 1 via the bus 4. Further, the CPU 0 is informed of the fact that the packet has arrived, from the host interface 23 via the bus 4. It is noted that if the size of configuration management information to be returned by the node 4 is greater than the frame length of the maximum size, the node 4 in some cases divides the configuration management information into some number of frames to return it. For this possibility, the last frame containing the configuration management information contains an end message.

When the CPU 0 has received a frame containing the end message showing that the configuration management information from the node 4 has been completely transmitted (step 9), it extracts configuration management information from one or a plurality of packets transferred to the memory 1, and transfers the information to the host interface 23 via the bus 4. The host interface 23 further transfers this information to the network configuration manager 37 (step 10). In this way, the configuration management information is registered on a new node.

Next, the network configuration manager 37 instructs the controller 38 to publish a configuration change control message. The network configuration manager 37 also informs the controller 38 of a node number of an immediately upstream node (3 in this embodiment), a node number of an immediately downstream node (4 in this embodiment), and a newly given node number (9 in this embodiment). The controller 38 determines whether or not the frame insertion buffer 32 is empty (step 11). If it is empty, the controller 38 instructs the transmitter 33 to transmit a configuration change control message. Further, the controller 38 also informs the transmitter 33 of the node number 3 of the immediately upstream node, the node number 4 of the immediately downstream node, and the newly given node number 9.

The transmitter 33 takes out the template of the configuration change control message from the buffer 36, and writes the node number 3 in the UN field, the node number 4 in the DN field, and the node number 9 in the NN field to complete the configuration change control message, transmitting it onto the transmission line 20 (step 12).

Upon receiving the configuration change control message that has returned back around (step 13), the receiver 31 informs the controller 38 of it. If the frame insertion buffer 32 is empty (step 14), the controller 38 instructs the transmitter 33 to transmit the token.

The transmitter 33 writes the this time newly added node number into the NN field of the template of the token within the buffer 36, and takes out and transmits the token to the transmission line 20 (step 15).

If a start control message meaning a rejection has returned at step 5, the node number present in the NNN field is additionally registered in the network configuration manager 37. This is followed by the operation of steps 3 and following.

Figure 9B:
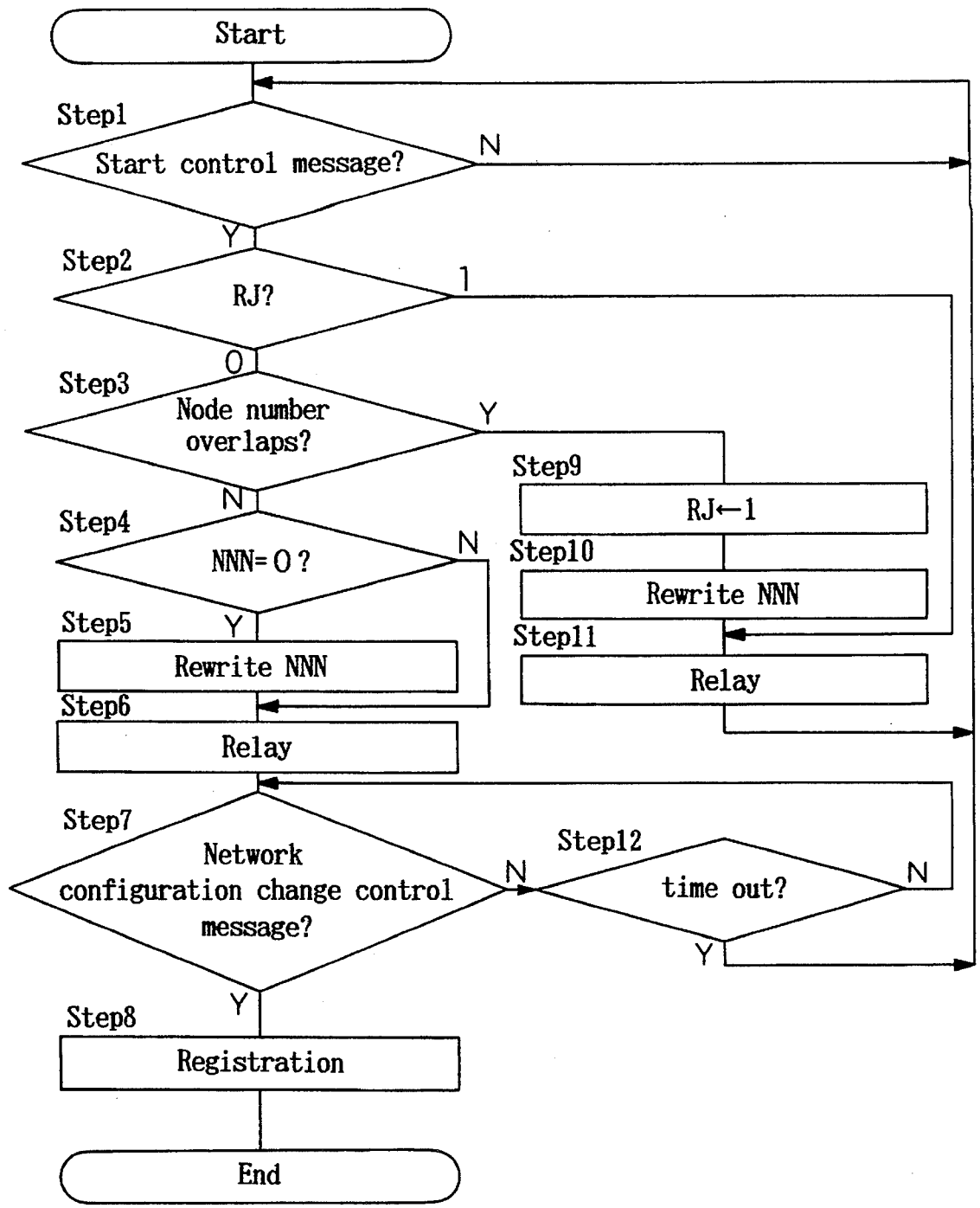
FIG. 9b is a flow chart showing the operation of nodes that have already been on the communication ring, when a node is to be newly connected to the communication ring.

Next, description is made upon FIG. 9b. The receiver 31 of the node that has received the start control message (step 1) informs the controller 38 of it. The receiver 31 further informs the controller 38 of an RJ bit, an NN field, and an NNN field of this message. If the frame insertion buffer 32 is empty and the node is not under data transmission, the start control message is allowed to pass through the frame insertion buffer 32, being transferred to the transmitter 33. Otherwise the start control message stays in the frame insertion buffer 32, and the message is transferred to the transmitter 33 after the condition that the frame insertion buffer 32 is empty and the node does not send any packet is established.

The controller 38 determines whether or not the RJ bit of which it has been informed is 1 (i.e. whether or not the node number has been rejected) (step 2).

If the RJ bit is 1, the controller 38 instructs the transmitter 33 to transmit the received start control message to the transmission line 20 as it is (step 11).

If the RJ bit is 0, the controller 38 determines whether or not the value of the NN field coincides with the node number of the node, i.e. whether or not the node number of the start control message overlaps that of the node (step 3). If the node number overlaps, the controller 38 informs the transmitter 33 to reject the node number. The transmitter 33 assigns 1 to the RJ bit of the received start control message (step 9), and rewrites the NNN field to the node number of the self node (step 10), transmitting it onto the transmission line 20 (step 11).

If there is no overlap in node number at step 3, the controller 38 determines whether or not the value of the NNN field is 0 (step 4). If it is 0, the controller 38 informs the transmitter 33 of the fact that a new node has been connected immediately upstream, and further informs it also of the node number of the self node. Upon receiving this, the transmitter 33 rewrites the NNN field of the received start control message to the node number of the self node (step 5), transmitting it to the transmission line 20 (step 6).

If the value of the NNN field is not 0 at step 4, the controller 38 instructs the transmitter 33 to relay the received start control message as it is (step 6).

Upon receiving the configuration change control message (step 7), the receiver 31 informs the controller 38 of it. Further, the receiver 31 informs the controller 38 also of the values of the UN field, DN field, and NN field of the configuration change control message. The controller 38 informs the network configuration manager 37 of these field values of which the controller 38 has been informed, and then the network configuration manager 37 rewrites its holding configuration management information (step 8). The received configuration change control message is allowed to pass through the frame insertion buffer 32, being relayed from the transmitter 33 to the transmission line 20.

Upon receiving the configuration change control message at step 7, the receiver 31 copies the received configuration change control message also into the input buffer 34. This message is transferred from the input buffer 34 to the host interface 23, and stored in the memory 1 via the bus 4. The host interface 23 informs the CPU 0 of the fact that the message has arrived. The CPU 0 refers to the configuration change control message within the memory 1, thereby knowing the fact that a new node 9 has been stored between node 3 and node 4.

Over these steps, a unique node number is given to a new node, and all the nodes recognize that a new node has been added.

In the above embodiment in view of the case where the start control message is rejected, it is arranged that the contents of the configuration management table of each node will not be changed until a configuration change control message arrives. However, such a thing seldom happens because the tokens that circulate on the transmission line 20 are observed before the start control message is transmitted by a newly connected node. Therefore, it is allowed to exercise change in the configuration management table for each of the nodes that have already been connected to the transmission line 20, simultaneously with the reception of a start control message. In this case, however, there arises the need of a control message for changing again the contents of the configuration management table when a rejection has occurred.

With the above arrangement, it has become possible to determine a node number unique to a node that is to be newly connected, by observing the token that circulates on the transmission line, and therefore to publish a token corresponding to the node promptly.

Next described is the operation of eliminating a node from the transmission line 20 in the present invention.

Figure 10:
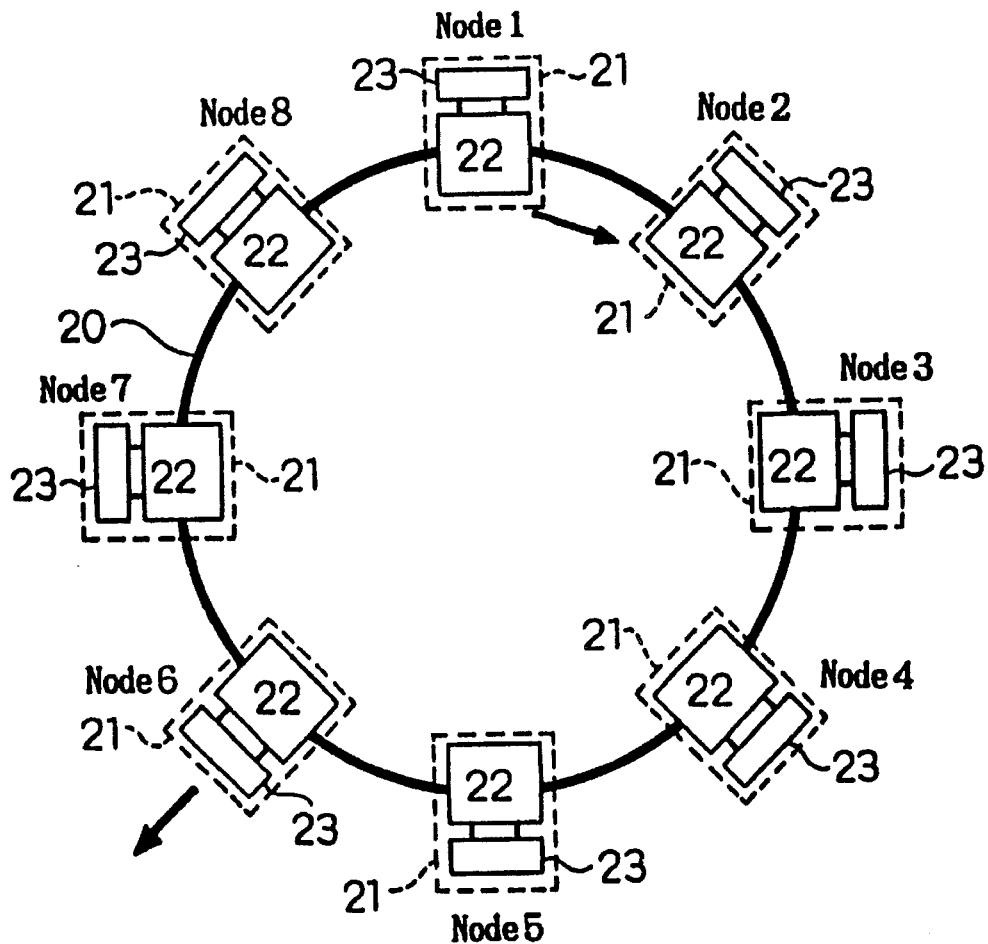
FIG. 10 is an explanatory view for explaining the operation in excluding a node from the communication ring of FIG. 2.

As shown in FIG. 10, here described is the operation in the case where a node 6 is to be eliminated from the communication ring as described with reference to FIG. 2.

Figure 11:
FIG. 11 is a format diagram showing an example of the configuration of the leaving control message used in excluding a node from the communication ring.
Figure 12:
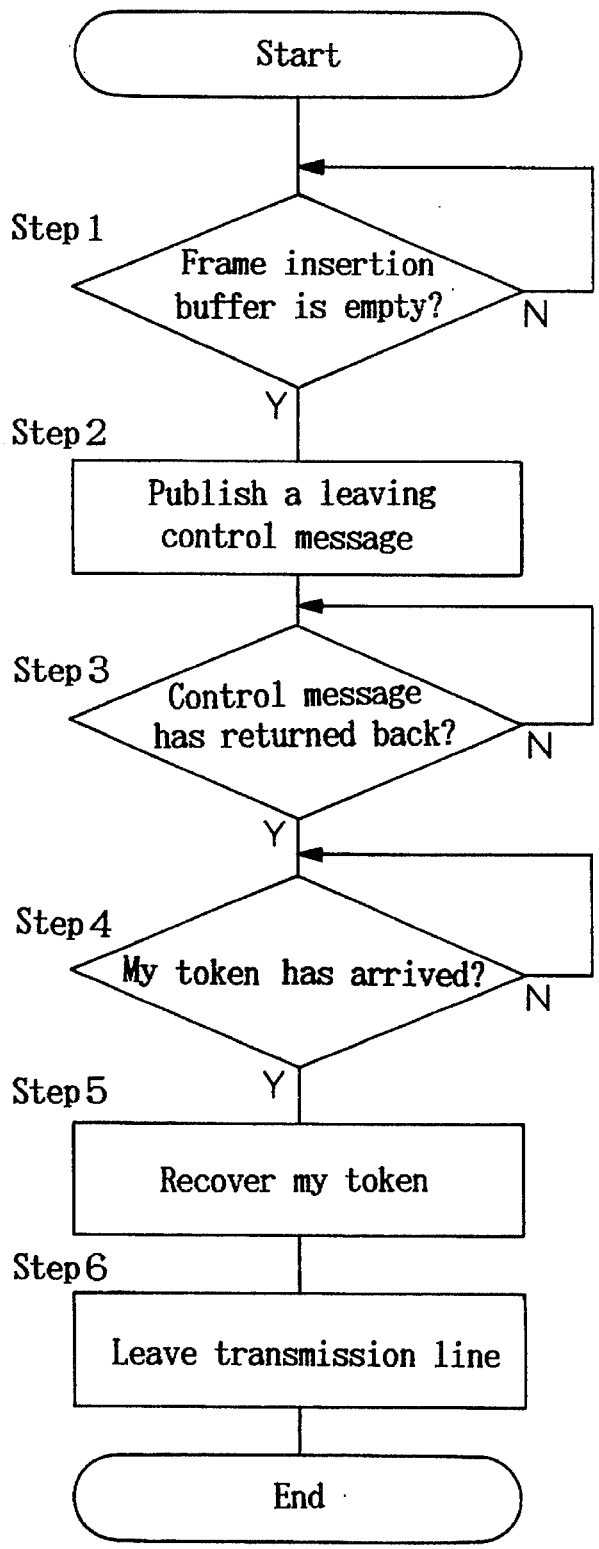
FIG. 12 is a flow chart showing the operation of a node that is going to leave the communication ring.

When a node is to be eliminated, it is necessary to change the configuration management information held by the other nodes and to remove my tokens that circulate on the transmission line 20. FIG. 11 diagrams a leaving-control message for this purpose. FIG. 12 shows the operation of the node to be eliminated (node 6 in this case).

In FIG. 11, the PA field, SD field, and ED field are similar to those as described with reference to FIG. 4a.

The FC field has the fact written therein that the message is a leaving-control message, while the NN field has a node number to be eliminated (6 in this case) written therein.

The following description is made on FIG. 12. In eliminating a node from the network, the controller 38 waits until the frame insertion buffer 32 becomes empty (step 1). Thereafter, the controller 38 instructs the transmitter 33 to transmit to the transmission line 20 a leaving-control message with a node number 6 written in the NN field (step 2).

The receiver 31, upon receiving the leaving-control message that has returned back around the transmission line 20 (step 3), informs the controller 38 of it.

Subsequently, when the receiver 31 has received my token (step 4), it informs the controller 38 of the reception. The controller 38 instructs the transmitter 33 to discard the token. The transmitter 33 stop transmitting my token (step 5). Finally, the node is excluded from the transmission line 20 (step 6).

The receiver 31 for each node, which has received the leaving-control message, informs the controller 38 of the reception. The receiver 31 further informs the controller 38 of the value 6 of the NN field of the leaving-control message. The controller 38 informs the network configuration manager 37 of both the NN field value 6 and the fact of separation. The network configuration manager 37 then eliminates the node 6 from the configuration management information that it has held. The leaving-control message is relayed from the transmitter 33 to the transmission line 20 via the frame insertion buffer 32.

The receiver 31 also copies the received leaving-control message to the input buffer 34. This message is transferred from the input buffer 34 to the host interface 23, and stored in the memory 1 via the bus 4. The host interface 23 informs the CPU 0 of the arrival of the message. The CPU 0, seeing the leaving-control message of the memory 1, knows that the node 6 is to be eliminated from the communication ring. The CPU 0 will not generate any packet destined to the node 6 from this time on.

It is noted that, in the present embodiment, the node is made to leave the transmission line physically immediately after my token is removed. However, a certain time elapse (e.g. a maximum token await time) may be allowed after the removal of my token before the node is made to leave the transmission line in physical fashion, in order to prevent the node from leaving before a frame destined to the node arrives. Also, by observing a token corresponding to another node that circulates on the transmission line, it is possible to make the node leave the transmission line when the same token has been observed two times, after the recovery of my token.

As described above, according to the present invention, a node can be promptly eliminated from the transmission line while the contents of the configuration management information of each of the nodes on the transmission line are subject to change.

Thus, the number of tokens that circulate on the transmission line can be changed flexibly depending on a change in the number of nodes.

What is claimed is:

1. A communication network system comprising:

a plurality of nodes connected to each other by a single ring-type network including a transmission line, each of the nodes on the transmission line having a frame insertion buffer;

a plurality of tokens circulating on the ring-type network, wherein each token corresponds to a respective node on the transmission line, wherein the number of tokens is approximately the same as the number of nodes;

means, within each node, for acquiring, when any one of the nodes has detected a circulating token corresponding to itself, the token corresponding to itself if the node holds data to be transmitted;

means, within each node and responsive to the means for acquiring, for transmitting at least part of the held data to a destination node on the transmission line only when the frame insertion buffer is empty, wherein the transmitted data is eliminated from the transmission line by the destination node; and means, within each node, for storing, in the frame insertion buffer, other data and tokens arriving at a node on the transmission line while the node is transmitting data.

2. The communication network system as claimed in claim 1, wherein when a first node on the transmission line has detected a token on the transmission line, the first node, if holding data destined to a second node on the transmission line, acquires the token and transmits at least a portion of the held data onto the transmission line on condition that a third node corresponding to said detected token is present on a path of the transmission line which ranges from the second node to the first node along the direction of progress of the token on the transmission line and which includes the first node and excludes the second node.

3. The communication network system as claimed in claim 1, wherein when a first node on the transmission line has detected a token on the transmission line, the first node, if holding data destined to a second node on the transmission line, acquires the token and transmits at least a portion of the held data onto the transmission line on condition that a third node corresponding to said detected token is present on a path of the transmission line which ranges from the second node to the first node along the direction of progress of the token on the transmission line and which includes both the first node and the second node.

4. The communication network system as claimed in claim 1, wherein each node on the transmission line, when an arrival interval of tokens corresponding to the own self node exceeds a maximum token wait time determined in a specified manner, republishes a token corresponding to the own self node.

5. The communication network system as claimed in claim 1, wherein each node on the transmission line, when it has detected one or more tokens corresponding to the own self node on the network in addition to a respective one token corresponding to the own self node, acquires and does not re-transmit any additional tokens corresponding to the own self node in order to eliminate the additional tokens corresponding to the own self node from the transmission line, so that only one token corresponding to the own self node circulates on the transmission line.

6. The communication network system as claimed in claim 5, wherein tokens corresponding to the nodes on the transmission line, respectively, are each assigned a sequence number, each of the nodes holds the sequence number lastly assigned to a token corresponding to the own self node, as a current sequence number, and each node, when having detected on the transmission line a token(A) corresponding to the own self node, the token having one said sequence number different from the current sequence number, eliminates the token (A) from the transmission line.

7. The communication network system as claimed in claim 6, wherein each node on the transmission line counts a time that has elapsed from an arrival of a token corresponding to the own self node, as a token wait time, said each node resets the token wait time at a time point when a token corresponding to the own self node has arrived again, and when the token wait time exceeds a certain maximum token wait time, the node publishes a token corresponding to the own self node, the token being assigned a sequence number different from the current sequence number held by the node.

8. The communication network as claimed in claim, wherein when a new node is connected onto the transmission line, the new node observes tokens circulating on the transmission line and publishes a token which is unique to the new node and different from the tokens corresponding to the nodes that have already been connected onto the transmission line.

9. The communication network system as claimed in claim 1, wherein before a node is eliminated from the transmission line, a token corresponding to the node is acquired and not re-transmitted in order to eliminate the token from the transmission line.

10. In a communication network system having a plurality of nodes connected to each other by a single ring-type network including a transmission line, a communication method comprising the steps of:

equipping the nodes on the transmission line with a frame insertion buffer;

circulating a plurality of tokens corresponding to the nodes, respectively, on the transmission line wherein the number of tokens is approximately the same as the number of nodes;

acquiring, when any one of the nodes has detected a circulating token corresponding to itself, the token corresponding to itself if the node holds data to be transmitted, transmitting, after a node acquires the token corresponding to itself, at least part of the data to a destination node on the transmission line only when the frame insertion buffer is empty;

storing data and tokens arriving at a node on the transmission line while the node is transmitting data in the frame insertion buffer; and eliminating data from the transmission line by the destination node.

11. A communication method which is used by nodes on a ring-type transmission line comprising the steps of:

equipping the nodes on the transmission line with a frame insertion buffer;

circulating a plurality of tokens corresponding to the nodes, respectively, on the transmission line, wherein the number of tokens is approximately the same as the number of nodes;

wherein each node has an own node number respectively, the token has a node number field respectively, one of the node numbers is written into the node number field of the each token in a manner that a different node number is initially written into a node number field of a different token, said communication method further comprising a transmitting method and a receiving method, the transmitting method comprising the steps of:

a token receiving step where a node receives a token circulating on the transmission line, a token judgment step where the node which received the token in said token receiving step judges that if a node number written in a node number field of the token which is received, coincides with an own node number of the node which received the token, the received token can be usable, a frame generation step where when the token which is received by the node is usable according to the token judgment step, and when the node which received the token holds data to be transmitted, the node generates a frame including at least a portion of the held data and a node number of a destination node of the data on a basis of the data and the received token, a frame transmission step where the node which generated the frame transmits the frame to the transmission line, a store step where in the case that when the node is transmitting the frame or the token to the transmission line in the frame transmission step, another frame which is different from said frame which is being transmitted and/or another token which is different from said token which is being transmitted arrive at said node which is transmitting the frame or the token, the another frame and/or the another token are stored in the frame insertion buffer of the node which is transmitting the frame or the token, and the receiving method comprising the steps of:

a frame receiving step where a node receives a frame from the transmission line, a frame judgment step where such judgment is executed by the node which received the frame, that a node number included in the received frame coincides with an own node number of the node which received the frame, a frame elimination step where only when the node number is coincided with the own node number in the frame judgment step, the node which received the frame in the frame receiving step does not transmit the received frame to the transmission line, and does transmit only the token which had been added to complete the received frame, to the transmission line.

12. A communication method according to claim 11, wherein said token judgment step further comprises the steps of where the node which received the token in said token receiving step judges that:

if a node number, written in a node number field of the token which is received, coincides with an own node number of the node which received the token, or if the node corresponding to said node number written in the node number field of the token is not present on a path of the transmission line which ranges from the node which received the token to a destination node of data which is held by the node which received the token along a direction of progress of a token on the transmission line and which includes the destination node the received token is usable.

13. A communication method according to claim 11, wherein said token judgment step further comprises the steps of where the node which received the token in said token receiving step judges that:

if a node number written in a node number field of the token which is received, coincides with an own node number of the node which received the token, or if the node corresponding to said node number written in the node number field of the token is not present on a path of the transmission line which ranges from the node which received the token to a destination node of data which is held by the node which received the token along a direction of progress of a token on the transmission line and which does not include the destination node, the received token is usable.

14. A communication method according to claim 11, further including a token republish method comprising the steps of:

an interval detecting step where a node on the transmission line detects an arrival interval of tokens which have the own node number of the node which detects the arrival interval, a token republish step where when the node detects that the arrival interval exceeds a maximum token wait time determined in a specified manner, said node republishes and transmits a token to the transmission line such that more than one token circulating on the transmission line may have the same node number.

15. A communication method according to claim 11, wherein each token which circulates on the transmission line has a sequence number field, the communication method further includes a double token elimination method comprising:

a holding step where a node holds as a current sequence number a sequence number in a sequence number field of a token which has an own node number of said node, a double token judgment step where a node executes such judgment that when a node number included in a token which is received in said token receiving step coincides with the own node number of the node which received the token, but the sequence number included in the token does not coincide with the current sequence number of the node which received the token, the received token is a double token, a token transmission step where if the received token is not the double token, the received token is transmitted to the transmission line, a token elimination step where if the received token is the double token, the received token is not transmitted to the transmission line and is thereby eliminated.

16. A communication method according to claim 14, wherein said republished token is such token that in a node number field of the republished token an own node number of the node which republishes the token is included and, in a sequence number field, a sequence number which is different from a current sequence number held by the node which republishes the token is included.

17. A communication method according to claim 11, further comprising a new node generation method which includes the steps of:

an observation step where a newly connected node observes node number fields of all tokens which circulate on the transmission line, a node number hold step where the newly connected node holds an own node number which is different from any node number included in all tokens which circulate on the transmission line, a new token generation step where the newly connected node generates a new token which has the own node number of the newly connected node in the node number field, and a token publish step where the newly connected node transmits the new token to the transmission line.

18. A communication method according to claim 11, further comprising a node elimination method where, before a node is eliminated, the node which is to be eliminated receives a token on the transmission line and when the received token has a node number which coincides with an own node number of the node which is to be eliminated, the node which is to be eliminated does not transmit the received token to the transmission line, thereby eliminating the token.

* * * * *

UNITED STATES PATENT AND TRADE MARK OFFICE
CERTIFICATE OF CORRECTION

PATENT NO. : 5,490,145
DATED : February 6, 1996
INVENTOR(S) : Tanabe et al.

It is certified that error appears in the above-identified patent and that said Letters Patent is hereby corrected as shown below:

Column 1, line 67, after "by" delete "1" and insert --l--.

Column 4, line 37, after "message" insert a comma --,--.

Column 5, line 7, before "information" delete "significant" and insert --meaningful--.

Column 7, line 1, delete "during its use." and insert --to 1 which means the token is in-use.--.

Column 7, lines 8 & 9, delete "stops frames and tokens, and transmits the stored frames or tokens to the transmitter 33." and insert --transmits the stored frames or tokens to the transmitter 33, and stops to store frames or tokens.--.

Column 7, lines 19-23, delete --The network configuration manager 37 determines whether or not this number is included in the numbers of the nodes that are present downstream of the destination node searched and held before--.

Column 7, lines 26 & 27, after "numbers" delete "1 through 4" and insert --1, 6, 7 and 8--.

UNITED STATES PATENT AND TRADE MARK OFFICE
CERTIFICATE OF CORRECTION

PATENT NO. : 5,490,145
DATED : February 6, 1996
INVENTOR(S) : Tanabe et al.

It is certified that error appears in the above-identified patent and that said Letters Patent is hereby corrected as shown below:

Column 13, line 30, after "value" change "6" into --6--.

Column 13, line 32, after "value" change "6" into --6--.

Column 13, lines 57-58, delete "after the recovery of my token." and insert --after discarding my token.--

Column 15, line 29, claim 8, after "claim" insert --1--.

Column 15, line 51, claim 10, after "line" insert a comma --,--.

Column 15, line 64, claim 10, after "line" insert a comma --,--.

Column 15, line 64, claim 10, after "data" insert a comma --,--.

Signed and Sealed this

Twenty-second Day of April, 1997

BRUCE LEHMAN

*Commissioner of Patents and Trademarks*

*Attest:*

*Attesting Officer*